United States Patent [19]

States

[11] Patent Number: 4,671,193
[45] Date of Patent: Jun. 9, 1987

[54] PLANTING TOOL

[76] Inventor: Alan E. States, Box 218, Logan, Kans. 67646

[21] Appl. No.: 813,940

[22] Filed: Dec. 27, 1985

[51] Int. Cl.⁴ .............................................. A01C 7/06
[52] U.S. Cl. ...................................... 111/73; 111/86; 172/166
[58] Field of Search ...................... 111/73, 87, 86, 80, 111/85

[56] References Cited

U.S. PATENT DOCUMENTS

| | | | |
|---|---|---|---|
| 452,245 | 5/1891 | Szarkowski | 111/86 |
| 1,951,003 | 3/1934 | White | 111/73 |
| 3,797,418 | 3/1974 | Bridger | 111/73 |
| 3,815,528 | 6/1974 | Hawkins | 111/85 |
| 4,446,801 | 5/1984 | Machnee | 111/86 |
| 4,466,364 | 8/1984 | Hassenfritz | 111/73 |
| 4,607,581 | 8/1986 | Kopecky | 111/73 |

FOREIGN PATENT DOCUMENTS

| | | | |
|---|---|---|---|
| 89932 | 7/1967 | France | 111/87 |
| 1520055 | 2/1968 | France | 111/80 |
| 1098018 | 1/1968 | United Kingdom | 111/87 |

Primary Examiner—Richard J. Johnson
Attorney, Agent, or Firm—Kokjer, Kircher, Bradley, Wharton, Bowman & Johnson

[57] ABSTRACT

A planting tool especially for minimum tillage operations has a leading rolling coulter and an elongated, rigid knife behind the coulter to hold open a slot cut in the soil by the coulter. Blades mounted on the vertical knife cut lateral slices in the soil extending outwardly from each side of the slot and between the soil surface and the slot bottom. A fertilizer conduit deposits a band of fertilizer in the bottom of the slot and seeds gravitate through a seed tube onto a V-shaped deflector which directs them in both directions into the lateral slices in the soil. Press wheels mounted on the knife close and recompact the soil after the seeds are planted outwardly and above the band of fertilizer in the slot. The press wheel also serves as a gauge in conjunction with a flexible tool mount to regulate the depth of operation of the tool components relative to the soil surface.

8 Claims, 6 Drawing Figures

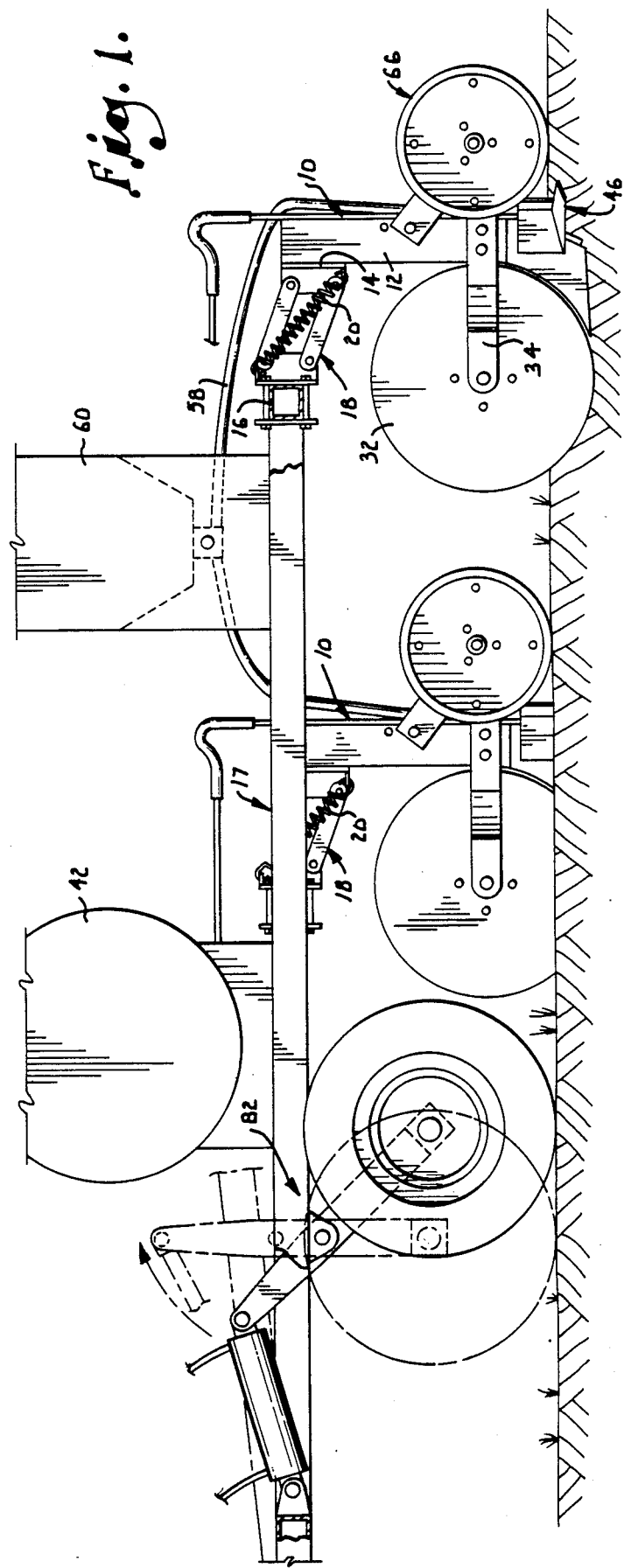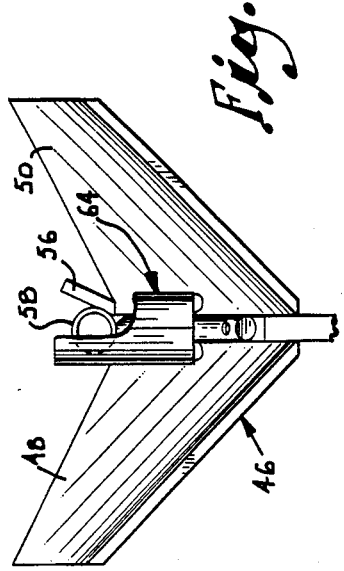

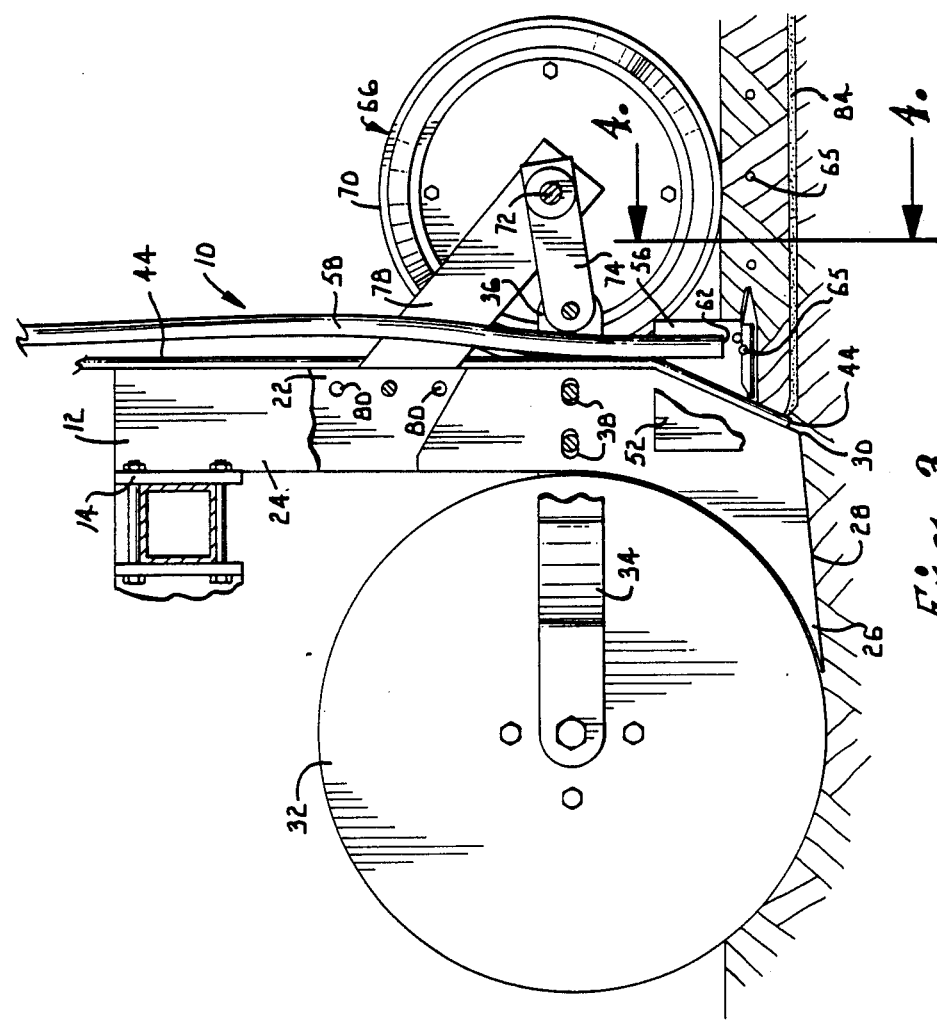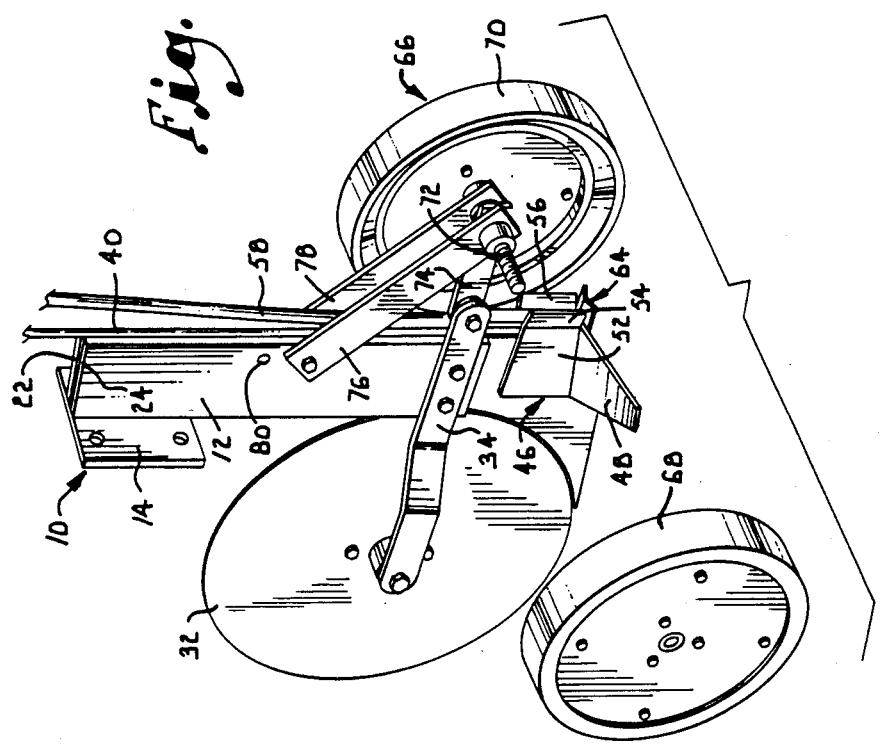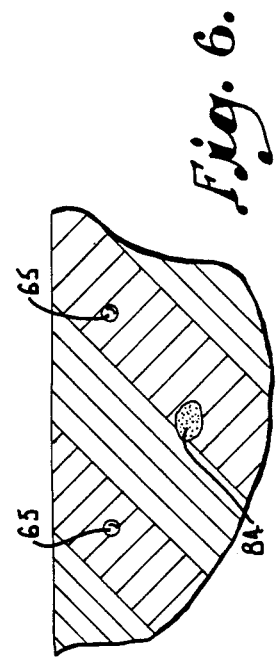

PLANTING TOOL

This invention pertains to agricultural implements and more particularly, to a planting tool for the optimum placement of seeds and fertilizer into the soil.

For many years considerable emphasis and attention was given in agriculture to the preparation of the seed bed prior to planting so that the planted seeds would have optimum soil conditions to stimulate and sustain growth. Seed bed preparation of this kind usually involved considerable stirring and working of the soil by plowing, disking and similar operations.

While such operations produced a desirable seed bed, the heavily worked soil was particularly prone to depletion of precious soil moisture needed for maximum crop production. The "clean farming" practices of plowing crop residue and debris under the soil surface was found to deprive the soil of vital mulch effective to minimize soil moisture loss through evaporation. The decomposition of such residue was found to "tie up" or render temporarily unavailable to the growing crop certain elements essential to production of maximum yields. Further, extensive soil working contributed substantially to problems of erosion of the soil. It also required the expenditure of huge amounts of energy which must be conserved because of depleting supplies and mounting energy costs.

Because of these and other problems, farmers have turned largely to practices wherein the soil is worked only minimally in planting crops. These practices have been termed "minimum tillage" or "no till" farming operations. Pursuant to such operations, the residue and debris is left on the soil surface before planting and the soil is only opened or disturbed to the extent necessary to place the seeds into the ground.

While such minimum tillage practices have been found to overcome the problems heretofore encountered with previous farming practices and to increase crop yields, certain problems remain. Seeds planted in untilled soil encounter difficulties in growing, particularly at the early stages of plant development, due to relatively hard, compacted soil. Further, it has heretofore been rather difficult to place the seeds and the fertilizer deposited with the seeds, in proper positional relationships for optimum production. Conventional planting implements have not been well suited for proper seed and fertilizer placement when operated in conditions involving relatively heavy crop residue on the soil surface.

Accordingly, it is a primary object of this invention to provide a planting tool which is capable of overcoming the problems associated with planting in minimum tillage conditions and effecting proper seed and fertilizer placement in soil worked only to the extent required for desirable plant conditions.

A further object of this invention is to provide a planting tool which is capable of planting seeds in proper proximal relationship over a band of fertilizer in a single operation in relatively hard soil and through relatively heavy surface residue.

Still another object of the present invention is to provide such a tool which can be readily and inexpensively installed on existing agricultural implements, thereby minimizing the expense required for use of the tool.

A yet further object of the instant invention is to provide a planting tool capable of achieving the foregoing objects, yet which is of straightforward, relatively uncomplicated, rugged construction, and which comprises a minimum of working parts to reduce the problems of wear and maintenance.

These and other important aims and objectives of the present invention will be further explained or will become apparent from the following description and claims.

In the drawings:

FIG. 1 is a fragmentary, detailed, vertical crosssectional view through a typical agricultural planting implement equipped with planting tools embodying the principles of this invention and showing the positions of the tools in the soil, parts being broken away to reveal details of construction, the alternate position of the support mechanism appearing in dot-dash lines;

FIG. 2 is an enlarged, partially exploded, perspective view of a planting tool embodying the principles of this invention;

FIG. 3 is a still further enlarged, detailed vertical cross-sectional view through an implement showing the planting tool of FIG. 2 in its planting position in the soil, parts being broken away to reveal details of construction;

FIG. 4 is an enlarged, fragmentary end elevational view of the tool taken from line 4—4 of FIG. 3;

FIG. 5 is a fragmentary, bottom elevational view of the tool taken along line 5—5 of FIG. 4; and FIG. 6 is an enlarged, fragmentary, generally schematic cross-section through the soil illustrating the typical placement of seeds and fertilizer by the tool of this invention.

A planting tool embodying the principles of this invention is broadly designated by the reference numeral 10 and comprises an elongated, rigid, upright knife 12 having an integral mounting plate 14 secured to the uppermost forward edge of the knife to facilitate attachment of the tool 10 to a beam 16 of an agricultural implement 17. Preferably, a spring biased mounting unit 18 is interposed between plate 14 and beam 16 for holding tool 10 in its proper working condition yet permitting limited upward movement of the tool against the bias of spring 20 forming a part of unit 18 to prevent breaking of the tool should rocks or other similar impediments be encountered during use of the implement.

The flexible mounting unit 18 also performs the highly important function of providing independent control over the depth of operation of each tool 10. Each tool has its own individual biasing force tending to hold it at its proper working depth in the soil. Irregularities encountered in the contour of the soil surface traversed by implement 17 are automatically accommodated by the flexing of the respective units 18 in such manner that each tool operates at all times at the appropriate depth. This insures that seeds are planted and the fertilizer is distributed in the proper soil zones.

Knife 12 is preferably constructed from a pair of identical, slightly spaced apart, rigid plates 22 and 24 which are welded together along their leading edges to present an elongated, forwardly arcuate member having a pointed leading end 26 and a lower edge 28 which inclines upwardly and rearwardly to the heel 30 of knife 12.

A coulter 32 is rotatably mounted forwardly of knife 12 on rigid arms 34 and 36 which are bolted to the knife. A pair of transversely extending slots 38 in knife 12 are elongated in the fore and aft direction to permit limited adjustment of the coulter relative to the knife. As is clearly evident in FIG. 3, the lowermost leading edge of knife 12 has a contour substantially concentric with the outer peripheral rim of coulter 32 with a slight spacing therebetween. Slots 38 permit limited adjustment of the arms 34 and 36 to maintain the desired amount of spacing between coulter 32 and the knife irrespective of wear which may occur to the coulter or on the knife or both.

A fertilizer conduit 40 is adapted to be coupled with a source of fertilizer such as tank 42 carried by implement 18 as shown in FIG. 1. Conduit 40 is preferably mounted at the trailing edge of knife 12 and terminates in an outlet opening 44 (FIG. 3) behind and slightly above heel 30 of knife 12.

Structure for cutting lateral slices in the soil is broadly designated by the reference numeral 46 and is best illustrated in FIGS. 2, 4 and 5. Structure 46 is carried by knife 12 near the lowermost edge of the latter and includes a pair of elongated, rigid blades 48 and 50 respectively. The blades 48 and 50 may be identical to one another. Each blade comprises a relatively flat plate 52 rigidly secured to the outer surface of its corresponding knife plate 22 or 24, and an integral, elongated outwardly tapering cutting portion projecting substantially normal to knife 12 in relative close proximity to the lower edge of the knife. Preferably, the leading edges of the projecting blades are sharpened to facilitate the cutting of the soil as the blade is moved forwardly by forward movement of implement 18.

A pair of vertically extending, spaced apart, outwardly inclined flanges 54 and 56 extend rearwardly from knife 12 as illustrated best in FIGS. 2 and 4 of the drawing. Preferably, the respective flanges 54 and 56 are integral with corresponding plates 52 of the respective blades 48 and 50. The flanges 54 and 56 diverge rearwardly as shown in the drawings and received therebetween an elongated tube 58 adapted to be connected with a source of seed to be planted by the implement. This source may take the form of a seed hopper 60 carried by implement 18. The lowermost outlet opening 62 of seed tube 58 terminates to the rear of knife 12 and well above the fertilizer tube outlet opening 44 as shown best in FIG. 3 of the drawing. The seed tube outlet 62 also terminates above the sharpened leading edge of the blades 48 and 50 of slice cutting structure 46. The blades 48 and 50 are inclined at a relatively small angle downwardly as the forward most sharpened edges of the blades are approached as shown best in FIGS. 1 and 4 of the drawing.

A deflector 64 best shown in FIGS. 2 and 4 is rigidly secured to the lowermost surfaces of the blades 48 and 50. Deflector 64 comprises an elongated fore and aft extending, rigid, inverted V-shaped member having its apex disposed immediately beneath the seed tube 58 as shown in FIG. 4. Deflector 64 is spaced slightly downwardly from the outlet opening 62 of tube 58 to present a pair of downwardly and outwardly sloping surfaces on each side of the center line of the tube and in position to deflect seeds 65 eminating from the tube in both directions laterally from knife 12.

Press wheel means broadly designated by the numeral 66 is carried by knife 12 rearwardly of the planting tubes as illustrated best in FIG. 2. Means 66 comprises a pair of side by side press wheels 68 and 70 journaled on a transversely extending axle 72 which is carried by a link 74 having its leading end pivotally coupled to the rearwardly projecting ends of the coulter mounting arms 34 and 36 as shown in the drawings. A pair of brace arms 76 and 78 are also pivotally coupled to shaft 72 and to any one of a plurality of vertically spaced apart mounting holes 80 extending through knife 12 so that the position of the press wheel means may be selectively adjusted vertically for adjusting the positions relative to the surface of the soil at which the seeds and the fertilizer are deposited. The press wheels serve as a gauge and cooperate with the yieldable or flexible mount 18 to insure that the tool components operate at the proper depth relative to the soil surface at all times.

In operation, it is contemplated that an implement such as implement 17 will be provided with a plurality of planting tools 10 as has been heretofore described in detail. The general arrangement of such an implement is depicted in FIG. 1 for explanation only. It will be understood by those skilled in the art that the particular number of mounting tools utilized, and the arrangement thereof, can be varied depending upon the structure of the implement and the particular planting operation desired. In the embodiment illustrated, implement 17 is equipped with hydraulically operated, ground engaging wheel structure 82 for selectively shifting the frame of implement 17 vertically between a standby position thereof where the tools are carried above the surface of the soil, to a planting position thereof wherein the soil working components of the planting tools are beneath the surface of the soil as illustrated in FIGS. 1 and 3 of the drawing.

With the tools in working positions, the implement is traversed forwardly so that coulter 32 cuts a vertically extending slot through any debris and crop residue which may lie on the soil surface and into the soil itself to the depth required for any particular planting operation. The lowermost end of knife 12 trails immediately behind the peripheral rim of coulter 32 to hold the slot open. A band of fertilizer 84 is applied directly into the bottom of the slot through the fertilizer conduit 40.

The outwardly projecting blades 48 and 50 simultaneously cut laterally extending slices into the soil from the faces of the slot and between the surface of the soil and the band 84 of fertilizer. Seeds to be planted are metered through the seed tube 58 whereupon the seeds move through outlet opening 62 and directly onto deflector 64. The seeds may be permitted to gravitate through the tube, or they may be pneumatically conveyed or otherwise moved through the tube.

The outwardly inclined, uppermost surfaces of deflector 64 deflect the seeds outwardly in both directions and into the respective slices in the soil extending outwardly from the slot. This places the seeds 65 in relatively close proximity above and outwardly from the band 84 of fertilizer as is illustrated schematically in FIGS. 3 and 6 of the drawing.

It will be recognized that the trailing edges of the respective blades 48 and 50 hold the lateral slices open so that the seeds deflecting from deflector 64 bounce outwardly into the corresponding slices before the soil has an opportunity to reclose.

Once the seeds are in the slices, the following press wheels exert sufficient vertical pressure on the soil surface to close the vertical slot and to compact the soil around the seeds in the lateral slices.

It will be recognized by those skilled in the art that the tool heretofore described is particularly well suited for planting crops in soil conditions involved in minimum tillage operation. The rolling coulter accommodates relatively hard packed soil and soil conditions involving substantial surface debris. The coulter cuts a relatively smooth slice with a minimum amount of working of the soil and a consequent minimum expenditure of energy. By the same token, the trailing knife holds this vertical slot open to permit the application of the fertilizer in a band at the bottom of the slot where it is in proper position for utilization of available soil moisture and to provide nutrients for the roots of the crop planted thereabove.

The novel outwardly extending blades provide the necessary slices for proper positioning of the seeds in relatively close proximity to the band of fertilizer, but not directly into the fertilizer wherein the tender, emerging roots of the sprouting crop would be "burned" by the fertilizer. Again, the blades effect only the slicing of the soil necessary to permit proper seed placement and do not over work the soil and unduly disturb the compaction desirable for this type of farming operation. Instead, the blades leave the uncut portions of the soil in a relatively compacted condition as is desired in minimum tillage operations. The novel deflector ensures that the seeds are properly positioned in the slice without the necessity for moving parts, and the following press wheels repack the soil and control depth of seed placement for optimum growing conditions.

Having thus described the invention, I claim:

1. A planting tool for a movable implement for planting seeds and placing a band of fertilizer in effective proximity beneath the seeds, said tool comprising:
    an elongated, rigid, upright knife adapted to be carried by the implement frame;
    a coulter secured to the knife forwardly of the latter in disposition to cut a vertically extending slot in the soil from the surface thereof, said knife being positioned relative to the coulter to hold the slot edges open immediately behind the coulter;
    a fertilizer conduit adapted to be coupled with a source of fertilizer for applying the fertilizer to the soil, said conduit having an outlet opening proximal the lowermost edge of the knife for outflow of the fertilizer in a band into the bottom of the slot;
    means carried by the knife for cutting a pair of lateral slices into the soil outwardly from the slot on both sides of the latter intermediate the soil surface and the slot bottom; and
    means for depositing seeds into the slice and outwardly in both directions from the slot, whereby said seeds are planted in effective proximity above the fertilizer band for nurture of the plants sprouting from the seeds.

2. A planting tool as set forth in claim 1, wherein said slice cutting means includes an elongated, rigid blade rigidly secured to the knife and extendrng laterally in both direction therefrom.

3. A planting tool as set forth in claim 1, wherein said tool includes means coupled with the knife and adapted to be coupled with the implement frame for yieldably mounting the tool to the implement to permit vertical movement of the knife relative to the frame.

4. A planting tool as set forth in claim 2, wherein said blade is substantially flat, the leading edge of the blade being sharpened to minimize soil resistance and to minimize stirring of the soil.

5. . A planting tool as set forth in claim 2, wherein said slice cutting means includes a pair of elongated, rigid blades, each blade being rigidly secured to a respective side of said knife.

6. A planting tool as set forth in claim 1, wherein said seed depositing means includes means adapted to be coupled with a source of metered seeds for conducting the seeds to the slot by gravity, said conducting means having an outlet opening adjacent the slot, and deflector means carried by the knife beneath the seed outlet opening in disposition to be engaged by seeds emerging from the opening to deflect the seeds in both directions into said slices.

7. A planting tool as set forth in claim 6, wherein said means for directing seeds into both of said slices includes a deflector carried by the knife and extending rearwardly therefrom, said deflector having a pair of deflector surfaces, said respective surfaces being inclined downwardly and outwardly from opposite sides of the slot in dispositions to deflect said emerging seeds into the corresponding slices in the soil.

8. A planting tool as set forth in claim 1, wherein is provided press wheel means carried by the knife in disposition to engage the surface of the soil rearwardly of the seed depositing means, whereby to regulate the planting depth and compact the soil around the seeds after the planting of the latter.

* * * * *